(12) United States Patent
Gloyer et al.

(10) Patent No.: US 10,876,732 B2
(45) Date of Patent: Dec. 29, 2020

(54) SCALABLE ACOUSTICALLY-STABLE COMBUSTION CHAMBER AND DESIGN METHODS

(71) Applicant: GTL Company, Tullahoma, TN (US)

(72) Inventors: Paul Gloyer, Tullahoma, TN (US); Eric Jacob, Tullahoma, TN (US); Jonathan French, Somerville, AL (US); Joshua Batterson, Manchester, TN (US); Tina Rice, Belvedere, TN (US); Gary Flandro, Tullahoma, TN (US)

(73) Assignee: GLOYER-TAYLOR LABORATORIES LLC, Tullahoma, TN (US)

( * ) Notice: Subject to any disclaimer, the term of this patent is extended or adjusted under 35 U.S.C. 154(b) by 343 days.

(21) Appl. No.: 15/729,591

(22) Filed: Oct. 10, 2017

(65) Prior Publication Data
US 2018/0106480 A1     Apr. 19, 2018

Related U.S. Application Data

(60) Provisional application No. 62/410,281, filed on Oct. 19, 2016.

(51) Int. Cl.
*F02K 9/52*     (2006.01)
*F02K 9/97*     (2006.01)
(Continued)

(52) U.S. Cl.
CPC .................. *F23R 3/18* (2013.01); *F02K 9/52* (2013.01); *F02K 9/62* (2013.01); *F02K 9/97* (2013.01);
(Continued)

(58) Field of Classification Search
CPC ........ F02K 9/62; F02K 9/97; F05D 2260/964; F23C 3/002; F23C 2900/03004;
(Continued)

(56) References Cited

U.S. PATENT DOCUMENTS 3,077,073 A * 2/1963 Kuhrt ........................ F02K 9/48
                                                                 60/259
3,397,537 A * 8/1968 Green, Jr. ................. F02K 9/52
                                                                 60/258

(Continued)

OTHER PUBLICATIONS

Theofilis, V., On the spatial structure of global linear instabilities and their experimental identification, Aerosp. Sci. Technol., Mar. 2000, pp. 249-262, vol. 4.
(Continued)

*Primary Examiner* — Scott J Walthour
(74) *Attorney, Agent, or Firm* — Kunzler Bean & Adamson

(57) ABSTRACT

A method comprising performing simulations to determine energy transfer between bulk fluid motion of gases through a combustion chamber and resonant acoustic modes of the combustion chamber using a simulation model. The method also comprises configuring one or more combustion chamber parameters for the simulation model to shape the resonant acoustic modes to diminish coupling between the resonant acoustic modes and driving mechanisms at a head portion of the combustion chamber and to enhance coupling between the resonant acoustic modes and damping mechanisms at an aft portion of the combustion chamber. The method further comprises determining whether the combustion chamber meets a predetermined performance level in response to determining that the combustion chamber meets a predetermined combustion stability level.

16 Claims, 6 Drawing Sheets

(51) Int. Cl.
*F02K 9/62* (2006.01)
*F23R 3/18* (2006.01)
*F23R 3/00* (2006.01)
*G06F 30/15* (2020.01)
*G06F 30/20* (2020.01)
*G06F 111/10* (2020.01)

(52) U.S. Cl.
CPC .............. *F23R 3/002* (2013.01); *G06F 30/15* (2020.01); *G06F 30/20* (2020.01); *F05D 2260/81* (2013.01); *F05D 2260/964* (2013.01); *F23R 2900/00018* (2013.01); *G06F 2111/10* (2020.01)

(58) Field of Classification Search
CPC .... F23C 2900/03009; F23R 3/18; F23R 3/42; F23R 3/425; F23R 3/44; F23R 3/46; F23R 3/54; F23R 2900/03342
See application file for complete search history.

(56) References Cited

U.S. PATENT DOCUMENTS

| | | | | |
|---|---|---|---|---|
| 4,644,745 | A | * | 2/1987 | Wagner ..................... F02K 9/62 60/258 |
| 5,353,598 | A | * | 10/1994 | Huck ...................... F02K 1/827 181/213 |
| 5,465,577 | A | * | 11/1995 | Schulte-Werning ...... F23R 3/02 60/722 |
| 2013/0008167 | A1 | * | 1/2013 | Akamatsu ............... F23R 3/002 60/725 |
| 2019/0145350 | A1 | * | 5/2019 | Patel ........................ F02K 9/64 60/770 |

OTHER PUBLICATIONS

Jacob et al., Nonlinear Liquid Rocket Combustion Instability Behavior using UCDS Process, American Institute of Aeronautics and Astronautics, Inc., Jul. 25, 2010, pp. 1-10.

Jacob et al., Determining Sources of Unsteady Energy Transfer in Time-Accurate Computational Fluid Dynamics, J. Propulsion Power, Jan. 2015, pp. 1-21, American Institute of Aeronautics and Astronautics.

Campos, L.M.B.C., On 36 Forms of the Acoustic Wave Equation in Potential Flows and Inhomogeneous Media, Applied Mechanics Review, Jul. 2007, pp. 149-171, vol. 60.

* cited by examiner

SCALABLE ACOUSTICALLY-STABLE COMBUSTION CHAMBER AND DESIGN METHODS

CROSS-REFERENCE TO RELATED APPLICATION

This application claims the benefit of U.S. Provisional Patent Application No. 62/410,281, filed on Oct. 19, 2016, which is incorporated herein by reference.

FIELD

This disclosure relates generally to combustion chambers, and more particularly to scalable acoustically-stable combustion chambers, and design methods, for aerospace and industrial applications, e.g. rocket engines, gas turbines for power plants, etc.

BACKGROUND

Combustion instability, or acoustic instability, is a phenomenon in which high-amplitude acoustic waves form in energetic flow fields. These waves form when the rate of energy supplied to resonating acoustic modes exceeds the rate of energy lost. This energy transfer occurs through a variety of flow processes. Chemical combustion is one such process known to induce acoustic instability. Since chemical combustion is fundamental to the operation of rocket engines, the likelihood for combustion instability is high. Therefore, producing liquid rocket engines typically involves a significant degree of design, building, and testing to verify that the engine remains acoustically stable during combustion. A variety of tools and designs are used in small-scale models before full-scale testing of rocket engines. However, reproducing stability properties and performance achieved with small-scale combustion chamber models in full-scale implementations has proven to be unattainable without making significant modifications to the full-scale model.

SUMMARY

The subject matter of the present application has been developed in response to the present state of the art, and in particular, in response to the shortcomings of conventional combustion chambers for rocket engines, that have not yet been fully solved by currently available techniques. Accordingly, the subject matter of the present application has been developed to provide a combustion chamber for a rocket engine and a process for designing a combustion chamber for a rocket engine that overcome the above-discussed shortcomings of prior art techniques.

Described herein is a method comprising performing simulations to determine energy transfer between bulk fluid motion of gases through a combustion chamber and resonant acoustic modes of the combustion chamber using a simulation model. The method also comprises configuring one or more combustion chamber parameters for the simulation model to shape the resonant acoustic modes to diminish coupling between the resonant acoustic modes and driving mechanisms at a head portion of the combustion chamber and to enhance coupling between the resonant acoustic modes and damping mechanisms at an aft portion of the combustion chamber. The method further comprises determining whether the combustion chamber meets a predetermined performance level in response to determining that the combustion chamber meets a predetermined combustion stability level. The preceding subject matter of this paragraph characterizes example 1 of the present disclosure.

The method further comprises performing additional simulations and further configuring the one or more combustion chamber parameters to shape the resonant acoustic modes in response to determining that the combustion chamber does not meet a predetermined combustion stability level. The preceding subject matter of this paragraph characterizes example 2 of the present disclosure, wherein example 2 also includes the subject matter according to example 1, above.

The method further comprises modifying the one or more combustion chamber parameters to improve performance in response to determining that the combustion chamber does not meet a predetermined performance level. The preceding subject matter of this paragraph characterizes example 3 of the present disclosure, wherein example 3 also includes the subject matter according to example 2, above.

Configuring the one or more combustion chamber parameters comprises shaping a geometry of the combustion chamber. The preceding subject matter of this paragraph characterizes example 4 of the present disclosure, wherein example 4 also includes the subject matter according to any one of examples 1-3, above.

Shaping the geometry of the combustion chamber comprises geometrically defining a diverging portion of the combustion chamber that, in a direction away from an injector end of the combustion chamber and toward an aft portion of the combustion chamber, diverges radially outward at an angle relative to a cylindrical axis of the combustion chamber. A diameter at the diverging portion of the combustion chamber is greater than a diameter of the combustion chamber at the injector end. The preceding subject matter of this paragraph characterizes example 5 of the present disclosure, wherein example 5 also includes the subject matter according to example 4, above.

Configuring the one or more combustion chamber parameters further comprises incorporating one or more of a resonator and a cavity, along at least a portion of the combustion chamber. The preceding subject matter of this paragraph characterizes example 6 of the present disclosure, wherein example 6 also includes the subject matter according to example 5 above.

Configuring the one or more combustion chamber parameters further comprises modifying a temperature profile of the combustion chamber by decreasing an aft portion temperature relative to a head portion temperature. The preceding subject matter of this paragraph characterizes example 7 of the present disclosure, wherein example 7 also includes the subject matter according to any one of examples 5-6 above.

Configuring the one or more combustion chamber parameters further comprises modifying a speed of sound profile of the aft portion relative to a head portion. The preceding subject matter of this paragraph characterizes example 8 of the present disclosure, wherein example 8 also includes the subject matter according to any one of examples 5-7 above.

Modifying the speed of sound profile comprises altering one or more of a combustion chemistry, an injection rate, an injector angle of impingement, an injector type, and injector mixing. The preceding subject matter of this paragraph characterizes example 9 of the present disclosure, wherein example 9 also includes the subject matter according to example 8 above.

Configuring the one or more combustion chamber parameters further comprises configuring an injection profile of a plurality of injector ports to diminish flow separation, the injector ports comprising fuel ports and oxidizer ports at the head portion of the combustion chamber. The preceding subject matter of this paragraph characterizes example 10 of the present disclosure, wherein example 10 also includes the subject matter according to any one of examples 5-9 above.

Configuring the injection profile comprises one or more of angling the injector ports, changing a size of the injector ports, changing a quantity of the injector ports, changing a ratio of fuel ports to oxidizer ports. The preceding subject matter of this paragraph characterizes example 11 of the present disclosure, wherein example 11 also includes the subject matter according to example 10 above.

The method further comprises producing a small-scale physical model of the combustion chamber having a shape based on the simulation model. The method also comprises verifying a combustion stability measure and a performance measure of the small-scale physical model of the combustion chamber. The preceding subject matter of this paragraph characterizes example 12 of the present disclosure, wherein example 12 also includes the subject matter according to any one of examples 5-11 above.

The method further comprises producing a full-scale combustion chamber that is shaped according to the shape of the small-scale physical model. The preceding subject matter of this paragraph characterizes example 13 of the present disclosure, wherein example 13 also includes the subject matter according to example 12 above.

Further described herein is a method of designing a combustion chamber for a rocket engine to meet a predetermined combustion stability level. The method comprises determining resonant acoustic modes of the combustion chamber using a simulation model. The method also comprises shaping the resonant acoustic modes to diminish coupling between the resonant acoustic modes and driving mechanisms at a head portion of the combustion chamber. The method additionally comprises geometrically defining a diverging portion of the combustion chamber that, in a direction away from an injector end of the combustion chamber and toward an aft portion of the combustion chamber, diverges radially outward at an angle relative to a cylindrical axis of the combustion chamber. A diameter at the diverging portion of the combustion chamber is greater than a diameter of the combustion chamber at the injector end. The method further comprises configuring at least one non-geometrical combustion chamber parameter for the simulation model to diminish coupling between the resonant acoustic modes and driving mechanisms at a head portion of the combustion chamber. The method also comprises determining whether the combustion chamber meets a predetermined performance level while continuing to meet the predetermined combustion stability level. The preceding subject matter of this paragraph characterizes example 14 of the present disclosure.

Additionally described herein is an apparatus comprising a combustion chamber having a generally elongated cylindrical shape. The apparatus also comprises an aft portion of the combustion chamber adapted to connect to a nozzle. The apparatus additionally comprises a head portion of the combustion chamber adapted to connect to an injector at an injector end. A substantial part of the head portion comprises a diverging portion that, in a direction from the head portion towards the aft portion, diverges radially outward at an angle relative to a cylindrical axis to diminish coupling between resonant acoustic modes and driving mechanisms at the injector end of the head portion. The preceding subject matter of this paragraph characterizes example 15 of the present disclosure.

The resonant acoustic modes are shaped to diminish coupling by altering one or more of acoustic pressure, acoustic velocity, acoustic density, acoustic temperature of the resonant acoustic modes. The preceding subject matter of this paragraph characterizes example 16 of the present disclosure, wherein example 16 also includes the subject matter according to example 15 above.

A ratio of a head portion length $L_H$ to a combustion chamber length $L_C$ has a range selected from the group consisting of 0.1 to 0.5, 0.5 to 0.95, and 0.6 to 0.8. The preceding subject matter of this paragraph characterizes example 17 of the present disclosure, wherein example 17 also includes the subject matter according to any one of examples 15-16 above.

The angle is within a range selected from the group consisting of 5.4° to 6.6°, 7.2° to 8.8°, 6° to 10°, 10° to 15°, and 4.5° to 7.5°. The preceding subject matter of this paragraph characterizes example 18 of the present disclosure, wherein example 18 also includes the subject matter according to any one of examples 15-17 above.

The apparatus further comprises a plurality of injector ports comprising fuel injector ports and oxidizer injector ports. The plurality of injector ports are disposed at the head portion. An injection profile of one or more of the plurality of injector ports is adapted to diminish flow separation. The preceding subject matter of this paragraph characterizes example 19 of the present disclosure, wherein example 19 also includes the subject matter according to any one of examples 15-18 above.

The one or more of the plurality of injector ports are angled to inject jets of reactants towards the diverging portion of the combustion chamber at an outward angle relative to the cylindrical axis. The preceding subject matter of this paragraph characterizes example 20 of the present disclosure, wherein example 20 also includes the subject matter according to example 19 above.

The described features, structures, advantages, and/or characteristics of the subject matter of the present disclosure may be combined in any suitable manner in one or more embodiments and/or implementations. In the following description, numerous specific details are provided to impart a thorough understanding of embodiments of the subject matter of the present disclosure. One skilled in the relevant art will recognize that the subject matter of the present disclosure may be practiced without one or more of the specific features, details, components, materials, and/or methods of a particular embodiment or implementation. In other instances, additional features and advantages may be recognized in certain embodiments and/or implementations that may not be present in all embodiments or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific embodiments that are illustrated in the appended drawings. Understanding that these drawings depict only typical embodiments of the subject matter and are not therefore to be considered to limit its scope, the subject matter will be described and explained with additional specificity and detail through the use of the drawings, in which.

DETAILED DESCRIPTION

Figures 1A, 1B:
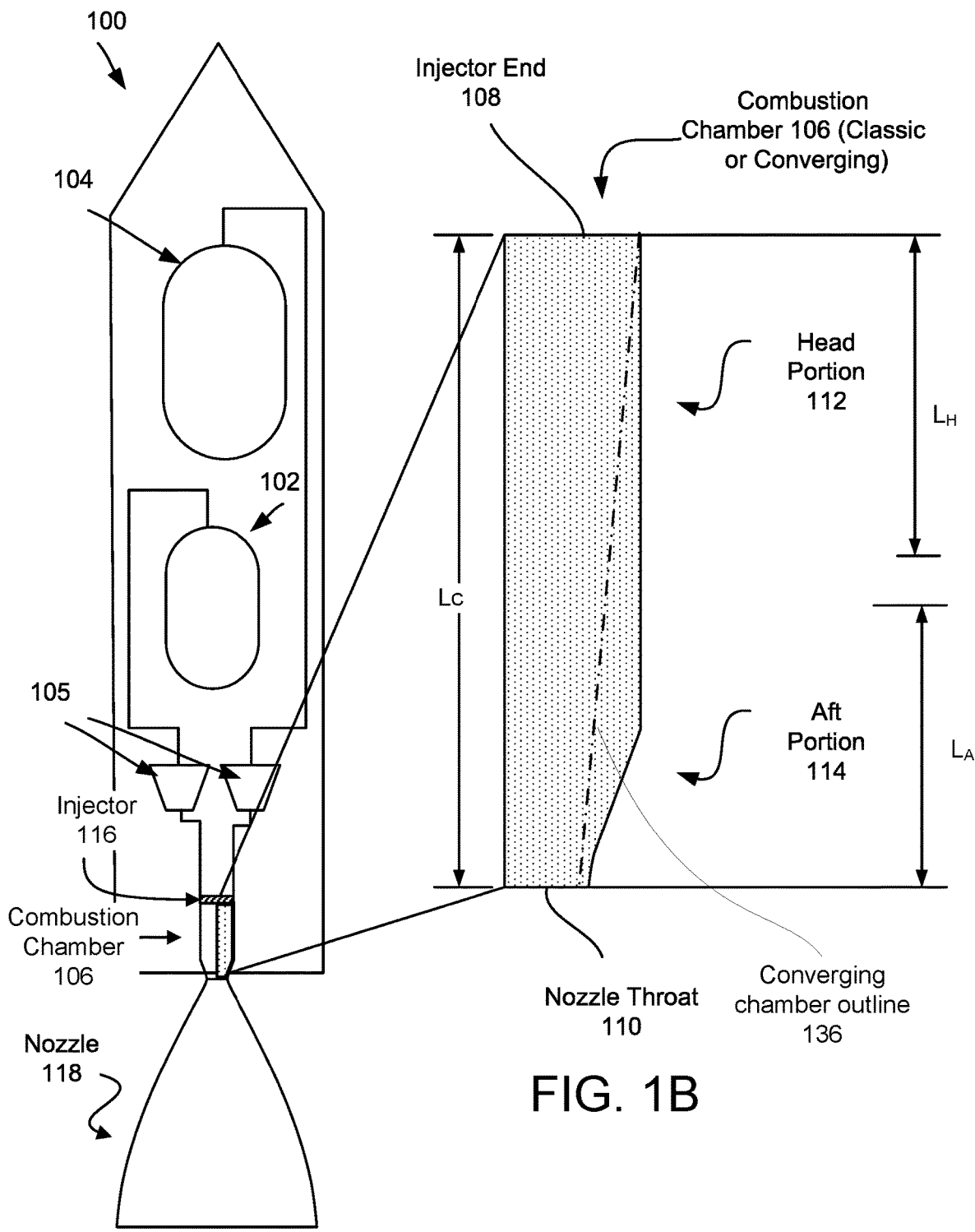
FIG. 1A is a schematic block diagram of a rocket with a classic-shaped combustion chamber.
FIG. 1B is a cross-sectional side elevation view of a half section of a classic combustion chamber of the rocket of FIG. 1A.

Reference throughout this specification to "one embodiment," "an embodiment," or similar language means that a particular feature, structure, or characteristic described in connection with the embodiment is included in at least one embodiment of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure. However, absent an express correlation to indicate otherwise, an implementation may be associated with one or more embodiments. In the Figures, similar numbers are intended to refer to similar elements unless otherwise clear from the context.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly predetermined otherwise. An enumerated listing of items does not imply that any or all of the items are mutually exclusive and/or mutually inclusive, unless expressly predetermined otherwise. The terms "a," "an," and "the" also refer to "one or more" unless expressly predetermined otherwise. Further, the term "plurality" can be defined as "at least two."

As used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, a system, apparatus, structure, article, element, component, or hardware "configured to" perform a predetermined function is indeed capable of performing the predetermined function without any alteration, rather than merely having potential to perform the predetermined function after further modification. In other words, the system, apparatus, structure, article, element, component, or hardware "configured to" perform a predetermined function is specifically selected, created, implemented, utilized, programmed, and/or designed for the purpose of performing the predetermined function.

As used herein, "configured to" denotes existing characteristics of a system, apparatus, structure, article, element, component, or hardware which enable the system, apparatus, structure, article, element, component, or hardware to perform the predetermined function without further modification. For purposes of this disclosure, a system, apparatus, structure, article, element, component, or hardware described as being "configured to" perform a particular function may additionally or alternatively be described as being "adapted to" and/or as being "operative to" perform that function.

As used herein with regard to fluid dynamics, "coupled" or "coupling" refers to a close relationship between fluid flow features and/or design features.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

By way of overview, it may be noted that combustion instability is a great technical risk that may be encountered during combustion device development (e.g. rocket motor, rocket engine, gas turbine engine, gas turbine augmentor). Combustion instability may be quantified by determining the unsteady energy transfer—referring to energy transfer between the bulk fluid motion and the unsteady flowfield. This flowfield typically refers to resonating or resonant acoustic modes. As used in the Figures and the descriptions herein, for shortness of labeling, resonant acoustic modes are referred to simply as acoustic modes 320, 420, 620 as representatively depicted in FIGS. 3, 4, 5, and 6B, unless otherwise clear from the context. Although in some other contexts the flowfield may also refer to more general non-resonant hydrodynamic modes, which may be analyzed through comparable techniques, such modes are not generally the focus of the embodiments depicted herein.

Figures 3, 4:
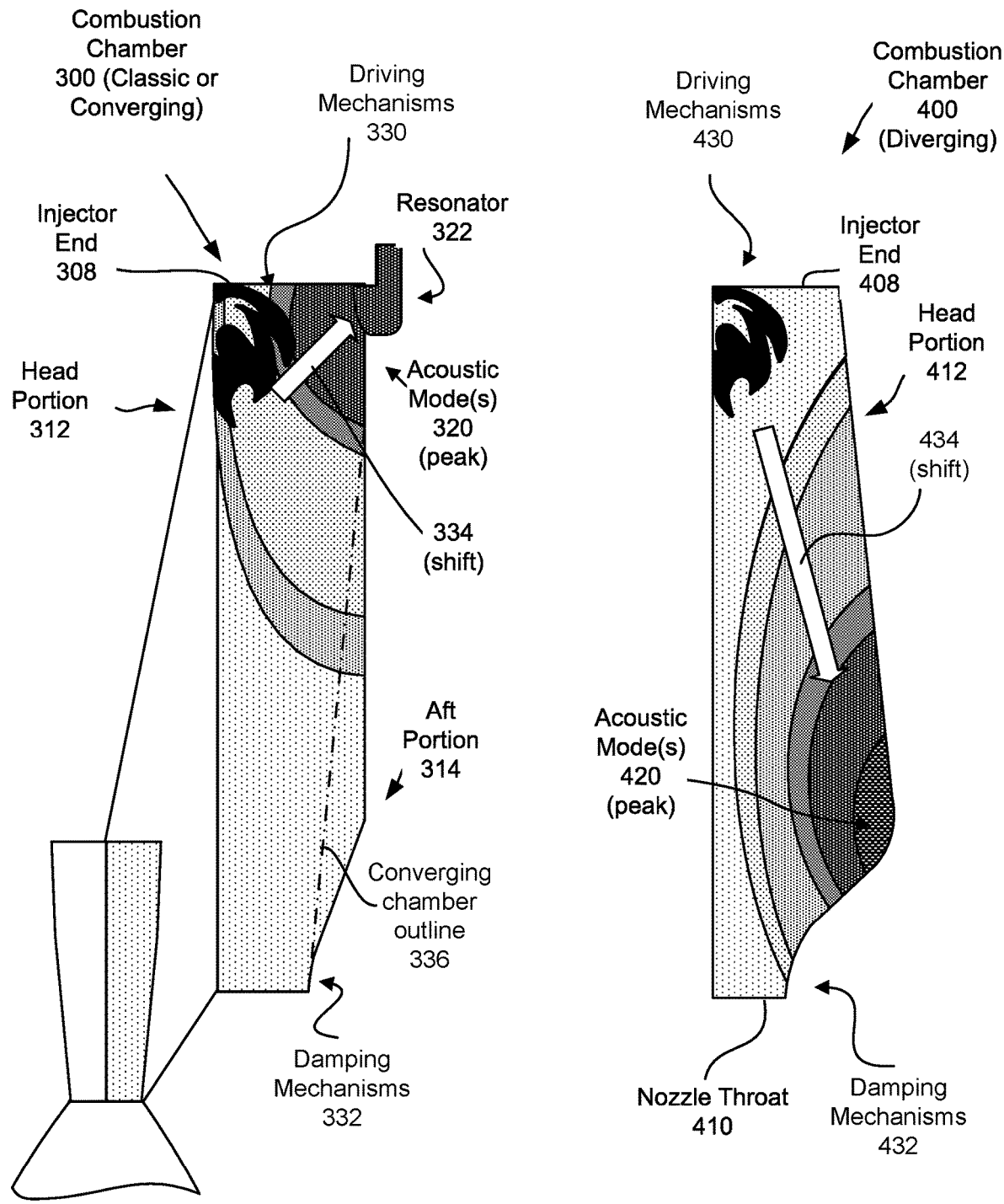
FIG. 3 is a cross-sectional side elevation view of a classic combustion chamber that includes resonators at the injector end of the classic combustion chamber.
FIG. 4 is a cross-sectional side elevation view of a diverging combustion chamber, according to one or more embodiments of the present disclosure.
Figures 6A, 6B:
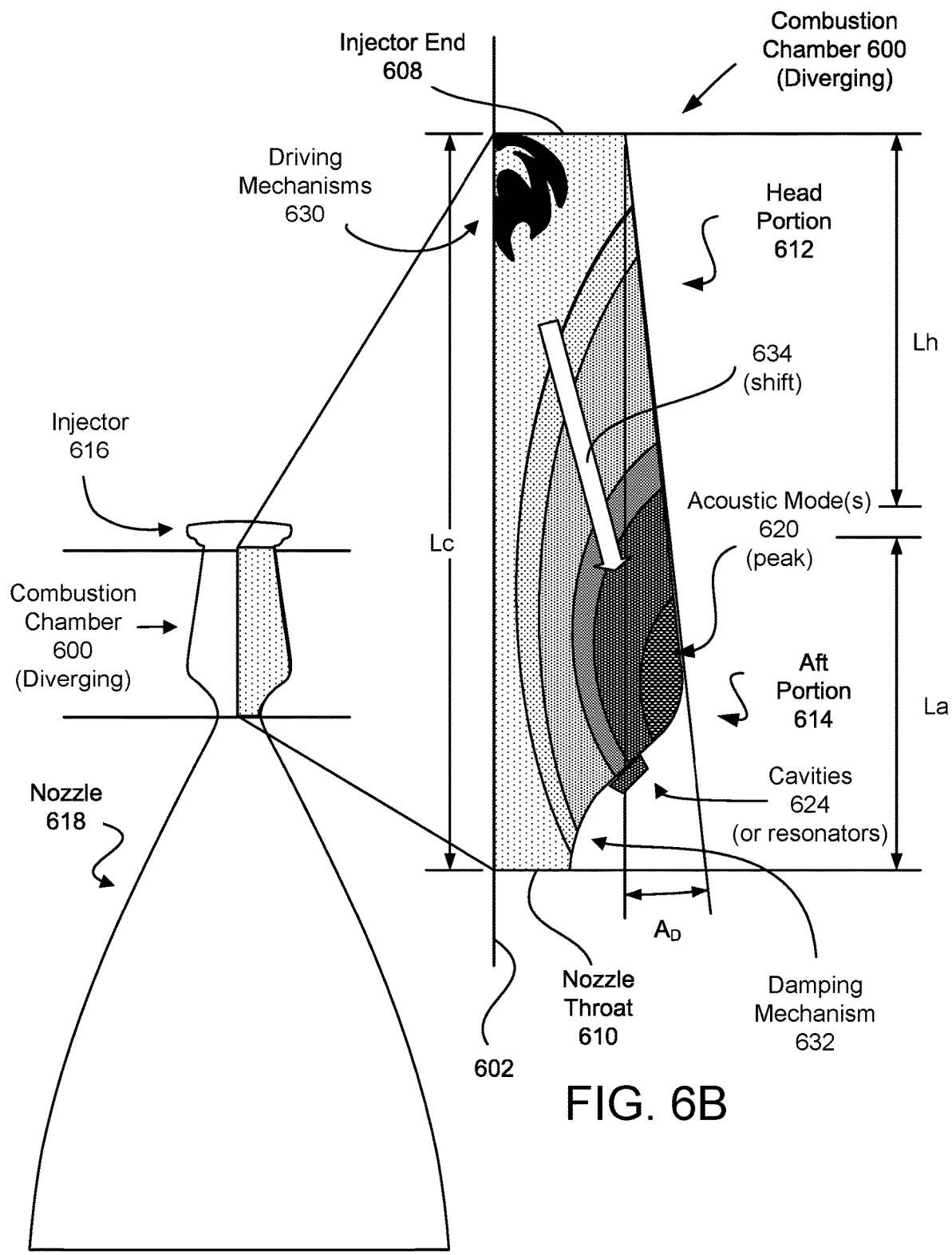
FIG. 6A is a cross-sectional side elevation view of a diverging combustion chamber, an injector at a head portion of the diverging combustion chamber, and a nozzle at an aft portion of the diverging combustion chamber, according to one or more embodiments of the present disclosure.
FIG. 6B is a cross-sectional side elevation view of a half section of the diverging combustion chamber of FIG. 6A depicting resonant acoustic modes coupled to an aft portion of the diverging combustion chamber, according to one or more embodiments of the present disclosure.

Unsteady energy transfer is a result of coupling between a resonant acoustic mode (e.g., resonant acoustic modes 320, 420, 620) and a multitude of physical mechanisms, referred to herein as driving mechanisms (e.g., driving mechanisms 330, 430, 630 as representatively depicted in FIGS. 3, 4, and 6B). It may be noted that the depiction of the flame symbol (e.g., to represent driving mechanisms 430, 630) is merely illustrative of combustion which is one type of driving mechanism and should not be interpreted as implying that combustion or any other driving mechanism is taking place at a specific location or offset distance from the injector end of the combustion chamber. Indeed, in some embodiments, the combustion distance is offset to varying degrees based on factors, such as for example, injector configurations and burning profiles. Moreover, it may be noted that the driving mechanisms (e.g., 430, 630) are illustrated with a flame symbol but may include both combustion and non-combustion driving mechanisms.

If the total rate of energy transfer from the mean flow into the resonant acoustic mode is positive, the mode is unstable and its amplitude will grow linearly, following an exponential growth curve, until nonlinear effects impose a limit.

Many of these physical driving mechanisms have complex characteristics that make it difficult to predict their effect on unsteady energy transfer. Moreover, many resonant acoustic modes may exist simultaneously within a system. Each acoustic mode is defined by a frequency and mode shape. The way with which any acoustic mode interacts with the bulk fluid flow varies with the acoustic mode frequency and shape. Therefore, changing a design parameter to improve the stability of one acoustic mode has the potential to adversely affect another acoustic mode.

The characteristics of acoustic energy transfer change in complex ways with the scale (i.e. physical size) of a combustion device. Historically, this has inhibited the effectiveness of iterative testing at the small scale then increasing the size of the device after acceptable stability characteristics are achieved. For example, because a large scale combustion chamber often behaves differently than its small scale model, the large scale combustion chamber often may be redesigned and in some cases, new small scale models may be created. These types of redesign efforts may greatly increase the development cost and development time for large combustion devices.

Therefore, a scalable combustion chamber design is one where sources of acoustic energy are thoroughly decoupled from acoustic modes at any size. By decoupling the acoustic modes e.g., 320, 420, 620 from the driving mechanisms e.g., 330, 430, 630, a successful full-scale model, that achieves the same scaled performance characteristics as the small-scale model, may be produced based on the small-scale model. Conceptually, if the engine design shapes the acoustic mode in such a way to spatially decouple it from sources of energy transfer, then the complex interplay between the flow and the acoustics as well as any nonlinear effects are inherently nullified. The description below expands upon this overview section gives more details about both classic combustion chambers, converging combustion chambers, and various embodiments of the new diverging combustion chamber and design methods which are depicted and described below.

FIG. 1A is a schematic block diagram of a rocket 100 with a combustion chamber 106 that has a classic shape. The rocket 100 includes a fuel tank 104 and oxidizer tank 102. The rocket 100 may also include pumps 105 that pump fuel from the fuel tank 104 and oxidizer from the oxidizer tank 102 to an injector 116. The injector 116 injects fuel and oxidizer into the combustion chamber 106. When the fuel and the oxidizer combust in the combustion chamber 106, expanding gases are forced through and out of nozzle 118, which propels the rocket 100.

Referring to FIG. 1B, the combustion chamber 106 is generally symmetrical with respect to a cylindrical axis. In other words, a cross-sectional area of all or a majority of the combustion chamber 106, with the classic shape, is the same along a length of the combustion chamber 106. As is explained in more detail below, resonant acoustic modes may be present during combustion. With regard to the location of such resonant acoustic modes, a combustion chamber 106 having a classic shape may be substantially similar to a converging combustion chamber as represented by the converging chamber outline 136 (illustrated using a dashed line). In other words, although the outer wall of the converging chamber decreases in diameter as it extends from an injector at the injector end 108 to a nozzle at the nozzle throat 110, the resonant acoustic modes of a converging chamber will tend to couple to the driving mechanisms at the head portion of the chamber near the injector end. Thus, for purposes of this application, references to combustion chamber 106 should generally be interpreted as applying both to classic combustion chambers (e.g., constant diameter combustion chambers) and converging combustion chambers (decreasing diameter combustion chambers), unless otherwise clear from the context.

The combustion chamber 106 has a length $L_C$ and includes a head portion 112 of length $L_H$. The combustion chamber 106 is generally cylindrical along the head portion 112. The combustion chamber 106 also includes an aft portion 114 of length $L_A$. At least part of the aft portion 114 contracts from the nozzle entrance to a minimum diameter at the nozzle throat 110.

Using simulation models of the combustion chamber 106, its stability during operation may be predicted. The flowfield—which includes combustion, vorticity, the thermodynamic character, and more—may couple with the natural acoustic resonant modes, which, in turn, may cause the combustion chamber 106 to be unstable.

As used herein, the term driving mechanism generally refers to flow phenomena that result in energy transfer into an acoustic wave. Conversely, damping refers to flow phenomena that extract energy from an acoustic wave. Driving and damping as used herein does not describe the thrust or performance of the chamber itself, but rather with respect to the growth or decay of the acoustic amplitude, respectively. The performance of the chamber is still primarily governed by non-acoustic effects.

An existing method of designing a rocket is to first design a small-scale model of the various components, including a small-scale model of the combustion chamber 106. Often, when an engine design is scaled (i.e. takes a successful small engine design and makes it larger) the design focuses on the performance rather than acoustic stability. There are many factors involved in determining the stability that change in complex ways with engine size. Because of this, larger scale engines are almost always more unstable than the smaller ones.

Because of cost and time needed to resolve instability problems resulting from existing combustion chamber design methods, this application disclosed various embodiments of a method for designing a scalable acoustically-stable combustion chamber to improve combustion chamber technology relative to the combustion chamber 106.

Figure 2:
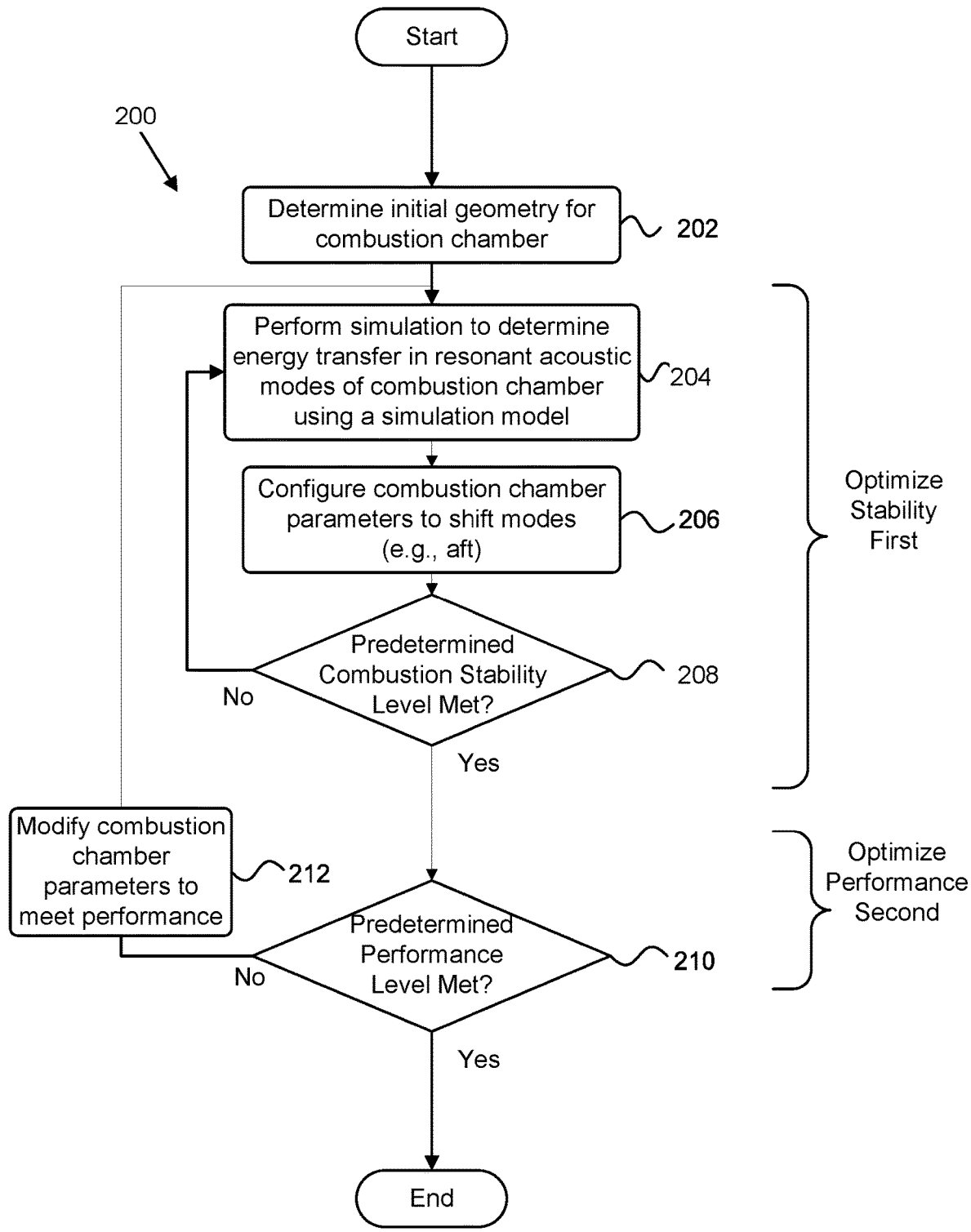
FIG. 2 is a schematic flow diagram of a method 200 for scalable design of an acoustically-stable combustion chamber, according to one or more embodiments of the present disclosure.

As depicted in FIG. 2, with some references to elements of FIG. 4 as is explained in more detail below, in some embodiments, the method 200 begins and includes determining 202 an initial geometry for the combustion chamber. In some embodiments, the method 200 further includes performing 204 a simulation, on the combustion chamber with the initial geometry, to determine energy transfer between bulk fluid motion of gases through the combustion chamber and resonant acoustic modes of the combustion chamber using a simulation model. In some embodiments, the initial geometry for the combustion chamber is predetermined such that the method 200 effectively skips action 202 and begins with action 204. In some embodiments, the method 200 includes configuring 206 one or more combustion chamber parameters in the simulation model to meet a predetermined combustion stability level.

It may be noted by a person of skill in the art that in some embodiments, any, some, or all the individual steps of the method 200 depicted in FIG. 2 may be performed simultaneously, performed in any order, performed iteratively, performed any number of times, performed passively and/or be omitted. For example, in some embodiments, steps such as performing simulation 204, configuring 206 the one or more combustion chamber parameters and determining 208 whether a predetermined stability level is met, may be performed together or a particular step e.g., 206 may be omitted or may be performed passively. For example, if a particular design is already stable, the configuring 206 the one or more combustion chamber parameters may mean allowing them to remain without modification.

According to some implementations, the predetermined combustion stability level is met by shaping the resonant acoustic modes 420 to diminish coupling between the resonant acoustic modes and driving mechanisms 430, shown in FIG. 4 at a head portion 412 of the combustion chamber 400, and to enhance coupling between the resonant acoustic modes 420 and damping mechanisms 432 at an aft portion 414 of the combustion chamber 400.

As used herein, the term "combustion chamber parameters" refers to one or more parameters in the simulation model that affects the performance and/or the stability of the combustion chamber during use. It may be noted that a large number of combustion chamber parameters may affect combustion chamber performance or stability. Certain combustion chamber parameters may have a more significant effect on performance or stability than others. In some embodiments, combustion chamber parameters may include structural parameters of the combustion chamber itself such as combustion chamber's geometric shape, structures that may be incorporated within, on, ahead of, and/or aft of, the combustion chamber such as for example injector port configuration or nozzle configuration.

In some embodiments, combustion chamber parameters may include chemistry or physics parameters such as for example profiles having to do with combustion temperature, speed of sound, and/or combustion chemistry itself. In some embodiments combustion parameters may include parameters related to combustion chamber performance e.g., combustion chemistry, combustion chamber shape, damping mechanisms, and the like. Some combustion chamber parameters may affect both stability and performance. It may be noted that unlike classic combustion chamber design or converging combustion chamber design, the methods described herein provide significant improvements over existing methods of configuring combustion chamber parameters by configuring combustion chamber parameters to achieve robust stability first and then modifying combustion chamber parameters as necessary to meet predetermined performance levels.

In one embodiment, performing 204 simulation to determine energy transfer between bulk fluid motion of gases through a combustion chamber and resonant acoustic modes of the combustion chamber and configuring 206 combustion chamber parameters to shape the resonant acoustic modes may be done using a simulation model. For example, performing 204 the simulation may be done using the Universal Combustion Device Stability™ ("UCDS") framework. The UCDS™ is available from Gloyer-Taylor laboratories, LLC ("GTL"), whose headquarters are located at 112 Mitchell Blvd, Tullahoma Tenn. 37388, USA. UCDS™ is an engineering analysis tool that provides detailed physical insight into the stability characteristics of complex combustion devices.

An overview of the Universal Combustion Device Stability™ (UCDS™) process is provided in this section. This overview is intended to highlight key aspects of the UCDS™ model and provide insight into the methodology that allows GTL to produce accurate predictions of the stability characteristics of combustion devices. These predictions can then be used to improve the stability and performance of these devices. In some embodiments, any of various simulation models available to one of ordinary skill in aerospace engineering to determine energy transfer between bulk fluid motion of gases through common question chamber and resonant acoustic modes of the combustion chamber may be used whether or not they include all the key aspects of the UCDS™ model.

The UCDS™ process achieves its predictive capability by quantifying verifiable energy gain and loss mechanisms. Measurable, or known, physical parameters are utilized in the mathematical modeling. Incorporation of physical effects and combustion mechanisms enable the computer simulation models in the UCDS™ process to accurately determine important stability-influencing parameters. This approach may be applied at any stage of a new combustion chamber development program and give direct assistance in avoiding, understanding, and correcting any unsteady motions that may threaten system operability.

UCDS™ applies the proven technique of linear superpositioning to overcome the limitations of numerical dissipation by separating the fluid dynamics of the combustion chamber into manageable parts. This approach follows classical acoustic theory where the linear decomposition is defined according to disparate temporal scales between the bulk fluid motion and the acoustic oscillations. By splitting the fluid physics per physical scales, each piece can be efficiently and quickly computed with modest computer resources.

The amplitude of an unstable acoustic mode will grow linearly—following an exponential curve—until nonlinear effects prohibit further growth. The linear growth in amplitude of an acoustic oscillation is defined by $R \propto \exp(\alpha t)$ where R is the amplitude of the acoustic mode, $\alpha$ is the growth rate, and t is time. If $\alpha<1$, the then amplitude will decay exponentially. Conversely, if $\alpha>1$, then the amplitude will grow. Therefore, defining the growth rate, $\alpha$, will quantify the stability of the system. This parameter is simply the rate of energy transfer between the steady and acoustic fields from all driving and damping mechanism. An equation for $\alpha$ may be derived by applying the UCDS™ linear decomposition technique to the fluid energy equation shown in equations Eq. (1), Eq. (2), and Eq. (3) below:

idealized situations, analytic models may be used. Alternatively, high-fidelity, time-accurate CFD solutions capturing acoustic instability may also be used within this framework. Doing so may be accomplished using any of several techniques to extract and separate the steady and unsteady fields. For example, the techniques may include those described in E. J. Jacob and J. W. Batterson, "Determining Sources of Unsteady Energy Transfer in Time-Accurate Computational Fluid Dynamics," J. Propuls. Power, vol. 31, no. 1, pp. 332-341, October 2015, which is incorporated herein by reference.

Next, the unsteady, oscillatory, acoustic field (referring to subscript 1) may be resolved in some embodiments by way of the acoustic wave equation or a convected wave equation. Various forms of the acoustic wave equation and or a convected wave equation are described in L. M. B. C. Campos, "On 36 forms of the acoustic wave equation in potential flows and inhomogeneous media," Appl. Mech. Rev., vol. 60, no. 4, p. 149, 2007, which is incorporated herein by reference.

In some embodiments, the unsteady, oscillatory, acoustic field may be resolved by a linear Navier-Stokes equations (LNS) such as described in V. Theofilis, "On the spatial structure of global linear instabilities and their experimental identification," Aerosp. Sci. Technol., vol. 4, no. 4, pp. 249-262, June 2000, which is incorporated herein by reference.

In some embodiments, using these approaches or similar approaches known to persons of ordinary skill in combus- $$\alpha' = \iiint_V \left\{ \begin{array}{c} \underbrace{-\nabla \cdot \left[ u_1 p_1 + \rho_1 u_0 \frac{p_1}{\rho_0} + \rho_0 u_1 (u_0 \cdot u_1) + \rho_1 u_0 (u_0 \cdot u_1) \right]}_{\text{Surface Work Terms(e.g. Nozzle Damping and Pressure Coupling)}} \\ \underbrace{-\rho_0 T_1 u_0 \cdot \nabla s_1 - \rho_0 s_1 u_1 \cdot \nabla T_0 - \rho_1 s_1 u_0 \cdot \nabla T_0}_{\text{Unsteady Entropy Generation}} + \\ \underbrace{m_1 \psi_1}_{\substack{\text{Viscous}\\\text{Effects}}} + \underbrace{T_1 Q_1}_{\substack{\text{Heat Release,}\\\text{Heat Transfer,}\\\text{Dissipation,}\\\text{Rayleigh, etc.}}} \underbrace{-\rho_0 u_0 \cdot (u_1 \times \omega_1)}_{\substack{\text{Unsteady Vorticity}\\\text{(Vortex Shedding)}}} \underbrace{-\rho_1 u_1 \cdot (u_0 \times \omega_0)}_{\substack{\text{Steady Vorticity}\\\text{(Flow Turning)}}} \end{array} \right\} dV$$

Eq. (1)

$$E_m^2 = \iiint_V \left\langle \underbrace{\frac{p_1^2}{2\rho_0 a_0^2} + \frac{\rho_0 T_0 s_1^2}{2c_p} + \rho_1 u_0 \cdot u_1 + \frac{1}{2}\rho_0 u_1^2}_{\text{Energy Density}} \right\rangle dV$$

Eq. (2)

where $$\alpha_m = \frac{\alpha'}{2E_m^2} = \frac{\text{Rate of energy transfer(Power)}}{\text{Energy within a mode(Energy)}} = \text{Normalized rate of energy transfer}(s^{-1})$$

Eq. (3)

In the above equations, subscript 0 refers to field variables pertaining to the bulk fluid motion, while subscript 1 refers to the acoustic oscillation. The variables u, p, $\rho$, T, S, m, Q, and $\omega$ refer to the velocity, pressure, density, temperature, entropy, mass flow, heat release, and vorticity, respectively. The UCDS™ process is designed to determine each of these field variables so that $\alpha$ may be determined.

The UCDS™ process begins by establishing the bulk fluid motion (referring to subscript 0). This can be done in a variety of ways. Typically, a steady state or time-averaged computational fluid dynamics ("CFD") solution is employed using a Reynolds averaged Navier-Stokes ("RANS") turbulence model. This captures the large-scale fluid motion. In tion chamber modeling, the acoustic field can be simulated throughout the entire combustion chamber, including up to the nozzle sonic throat, e.g. nozzle throat 110, 410. In some embodiments, as part of determining 202 energy transfer between bulk fluid motion of gases through a combustion chamber and resonant acoustic modes of the combustion chamber using a simulation model e.g., the UCDS™ process, the interaction of the acoustic field with solid surfaces, shear layers, and combustion regions is also accounted by determining rotational and entropic corrections to the pure acoustic solution.

Examples of determining rotational and entropic corrections to the pure acoustic solution are described in J. W.

Batterson, "Numeric Solutions of Vortico-Acoustic Combustion Stability Mechanisms in Rockets" and E. J. Jacob and J. W. Batterson, "On the Application of Unsteady Energy Transport Theory to Combustion Instability Flame Transfer Functions and Reduced Order Models," in 51st AIAA/SAE/ASEE Joint Propulsion Conference, 2015, which are both incorporated herein by reference.

In some embodiments, the method 200 includes performing 204 the simulation and configuring 206 the one or more combustion chamber parameters for the simulation model to shape the resonant acoustic modes (e.g., 420) to diminish coupling between the resonant acoustic modes (e.g., 420) and driving mechanisms (e.g., 430) at a head portion (e.g., 412) of the combustion chamber (e.g., 400) and to enhance coupling between the resonant acoustic modes (e.g., 430) and damping mechanisms (e.g., 432) at an aft portion (e.g., 414) of the combustion chamber (e.g., 400). Various embodiments of configuring 206 one or more combustion chamber parameters for the simulation model to shift resonant acoustic modes (e.g., 420) are described below in more detail with respect to FIG. 5.

In some embodiments, the method 200 continues and includes determining 210 whether the combustion chamber (e.g., 400) meets a predetermined performance level in response to determining 208 ("Yes" path) that the combustion chamber meets a predetermined combustion stability level. In other words, in some embodiments, the method 200 first determines 208 whether the combustion chamber (e.g., 400) meets a predetermined combustion stability level.

The particular predetermined combustion stability level for a given combustion chamber design may be provided as a specification or may be otherwise determined by one of ordinary skill in combustion chamber design using any known method.

For example, in one embodiment, a predetermined combustion stability level may be met if certain stability design guidelines are satisfied. In one embodiment, stability guidelines may include a requirement that the rate of energy transfer, $\alpha'$, or the linear growth rate $\alpha$ must be negative or zero for all acoustic modes. In one embodiment, stability guideline may include a requirement that the amplitude of an acoustic mode be below a predefined threshold. In some embodiments, the method 200 meets the stability design guideline criteria by decoupling acoustic modes shapes from key driving mechanisms such as heat release and entropic mechanisms. Thus, the acoustic mode shapes are moved away from the combustion region in the head portion of the combustion chamber near the injector end.

In some embodiments, a predetermined combustion stability level may be met by increasing key damping mechanisms (e.g., 432, 632) such as nozzle damping. Enhancing the stability margin by increasing damping may further include implementing measures to avoid introducing or enhancing non-combustion driving mechanisms. These non-combustions driving mechanisms may be avoided, for example, by diminishing flow shear layers since they may enhance the driving mechanisms via the vorticity mechanisms.

In some embodiments, if the method 200 determines 208 ("Yes" path) that the combustion chamber (e.g., 400) as modeled in the simulation model meets the predetermined combustion stability level, the method 200 continues by proceeding to determine 210 whether the combustion chamber e.g. 400 as modeled in the simulation model meets a predetermined performance level as shown in FIG. 2. In some embodiments, if it is determined 210 ("Yes" path) that the combustion chamber (e.g., 400) meets a predetermined performance level, the method 200 ends.

In some embodiments, if the method determines 208 ("No" path) that combustion chamber (e.g., 400) as modeled in the simulation model does not meet the predetermined combustion stability level, the method 200 continues by performing 204 additional simulation and further configuring 206 the one or more combustion chamber parameters to shape the resonant acoustic modes in response to determining 208 that the combustion chamber does not meet a predetermined combustion stability level.

In some embodiments, if the method 200 determines 210 that the combustion chamber in the simulation model does not meet a predetermined performance level, the method 200 further includes modifying 212 the one or more combustion chamber parameters to improve performance. It may be noted by one of skill in the art that in some embodiments, that the one or more combustion chamber parameters may often include some combustion chamber parameters that primarily affect performance and other combustion chamber parameters that primarily affect stability. In some embodiments, some of the one or more combustion chamber parameters may affect both performance and stability.

Some example embodiments of the one or more combustion chamber that affect stability are described in more detail below with respect to element 506 depicted in FIG. 5. Other example embodiments of the one or more combustion chamber parameters that may affect performance are described in more detail below with respect to element 510 depicted in FIG. 5. Then, as described above, the methods may include performing 204 further simulation and further configures 206 one or more combustion chamber parameters to shape the acoustic modes as explained above.

The embodiments of the methods depicted in FIGS. 2 and 5, in which stability is optimized first and performance is optimized second, represent a significant and surprising improvement over existing methods which optimize performance first and optimize stability second as is described in more detail below with respect to FIGS. 3, 4, and 5. Designing a small-scale model, according to the approach defined herein, first reduces the cost of testing and experimentation that would be associated with a full-scale model. This is achievable because the process specifies scalable methods to eliminate acoustic instability.

To diminish the cost of design iterations for the small-scale model and provide a priori stability analysis of the full-scale model, a computerized simulation model of the rocket may be utilized to simulate the response of the combustion chamber 106 to acoustic mode driving mechanisms generated during combustion. The small-scale model is used to validate the stability predictions provided by simulation and analysis. Upon validation, a comparable simulation and analysis may be performed on a scaled model. Any modifications to the design may now be confidently simulated and assessed for stability without incurring hardware costs.

Referring now to FIG. 3, in existing methods of combustion chamber design, combustion chambers are first designed to meet a predetermined performance level, after which various methods are applied to attempt to shift coupling of resonant acoustic modes (e.g., 320) to driving mechanisms (e.g., 330). For example, in some combustion chamber designs, a resonator 322 may be included at the head portion 312 near the injector end 304 of the combustion chamber 300 so as to at least partially diminish the coupling of the driving mechanisms 330 to the resonant acoustic modes 320. It may be noted that while resonators (e.g., 322)

are often disposed near the injector end 304 (e.g. near the headwall), resonators may be disposed at other locations of the chamber.

However, compressing the mode shape (e.g., shifting the resonant acoustic mode 320 against the injector end 308) decouples the tangential acoustics from some of the largest damping mechanisms 332 e.g., nozzle damping. The reduction of the nozzle damping mechanism from mode shape compression against the injector end 308 may lead to significant tangential mode stability issues. Thus, the resonators at the head portion 312 may decrease coupling between acoustic modes 320 and damping mechanisms 332 nozzle damping at the aft portion 314 and thus diminish some of the benefit from decoupling the resonant acoustic modes 320 from the driving mechanisms 330 by shifting 334 the acoustic modes towards the injector end 308. Accordingly, the methods, e.g., methods 200, 500, described herein may be employed to solve significant problems that exist in conventional combustion chambers and combustion chamber design.

FIG. 3 also depicts a converging chamber outline 336. Some existing combustion chambers may be referred to as converging chambers because in contrast to classic cylindrical chambers, at least a portion of the converging chambers begins to converge radially inward at an angle relative to the cylindrical access from the injector end to the nozzle throat as depicted by converging chamber outline 336. In some existing converging chamber designs the mode shape of the converging chamber as a strong axial gradient in the flames on the reduces the average magnitude for a flame that is offset from the injector base. If the flame were directly on the injector base, the converging and classic chambers would have essentially the same degree of instability from the combustion process.

It is possible to design stable rocket engines using either the classic combustion chamber shape (e.g., combustion chamber 300) or a converging shape as outlined in converging chamber outline 336. However, one significant problem of modifying classic and converging designs, to achieve performance first and then to address stability issues, is that as the design is moved from a simulation model to a small-scale physical model it may work as predicted by the simulation model, but when a full-scale physical model is derived from the small-scale physical model the measures taken to improve stability for the simulation model and the small-scale model may not translate effectively to the full-scale model. Thus, additional stability compensating measurements may need to be implemented on a full-scale model to meet a predetermined stability level.

This significantly increases the costs of complexity of ensuring that the combustion chamber meets certain predetermined stability levels and/or certain predetermined performance levels. Thus, there has been a long felt need in the field of combustion chamber design to improve the design methodology for designing scalable acoustically stable combustion chambers. Various apparatus and methods to solve the problems associated with classic combustion chamber and/or the converging combustion chamber are described in more detail below with respect to FIGS. 4, 5, 6A, 6B, and 7.

FIG. 4 is a cross-sectional side elevation view of a combustion chamber 400 that has a diverging shape, according to one or more embodiments of the present disclosure. In the embodiment, the combustion chamber 400 is shaped as a diverging combustion chamber, meaning that the head portion 412 of the combustion chamber 400 diverges outwardly or, in other words, increases in diameter as it is measured beginning at the injector end 408 to at least a part of the aft portion 414. This diverging shape causes the acoustic modes 420 to shift toward the aft portion 414. This diverging chamber design has been shown to consistently and repeatedly capture the resonant acoustic modes 420 in the region where the radius of the chamber is largest. This is true regardless of scale. Therefore, acoustic decoupling with the combustion driving mechanisms at the head portion of the chamber is achieved for a small-scale combustion chamber as well as a full-scale combustion chamber.

By shaping the combustion chamber 400 to be diverging, with one example shown in FIG. 4, the coupling of the resonant acoustic modes is shifted 434 away from the driving mechanisms 430 at the head portion 412 and towards the damping mechanisms 432 (e.g., nozzle damping) at the aft portion 414 and near the nozzle throat 410. The damping mechanisms 432 may increase combustion stability of the combustion chamber 400. Thus, a significant improvement in overall stability of the combustion chamber is achieved both by introducing damping mechanisms 432 at the aft portion 414 and shifting the coupling of the resonant acoustic modes away from the driving mechanisms 430 and towards the damping mechanisms 432.

Figure 5:
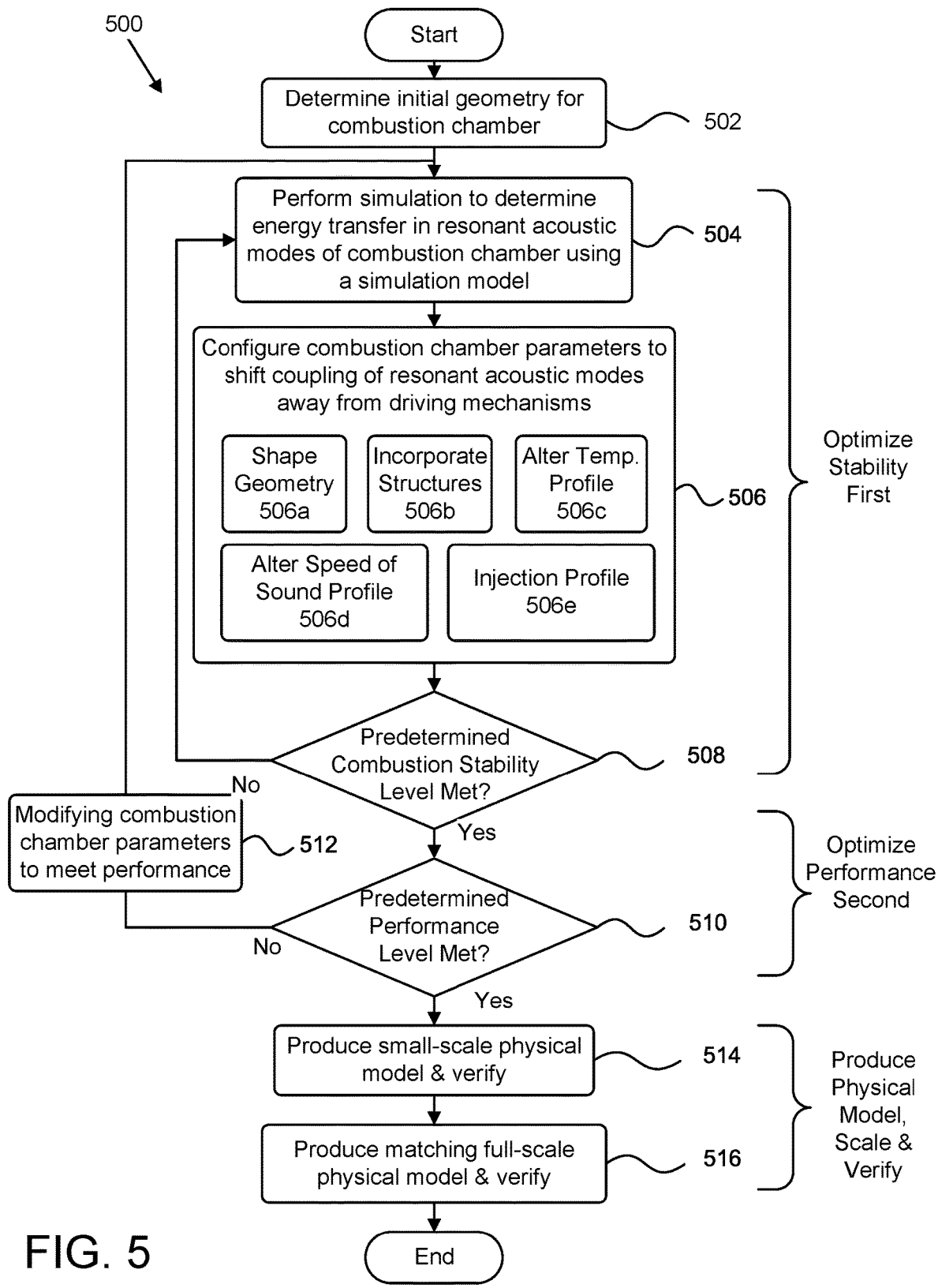
FIG. 5 is a schematic flow diagram of a method of scaled-model design of an acoustically-stable diverging combustion chamber, according to one or more embodiments of the present disclosure.

In some embodiments, the methods depicted in FIG. 5 build substantially on the method depicted above with respect to FIG. 2. FIG. 5 provides additional embodiments and additional details that may be significantly beneficial in overcoming the problems of the classic combustion chamber and existing combustion chamber design methods. Similarly, some embodiments of the combustion chamber 600 depicted in FIGS. 6A, 6B are substantially similar to the embodiments of the combustion chamber 400 depicted in FIG. 4. FIG. 6A, 6B provide additional embodiments and additional details about the combustion chamber 600 that is diverging that may be significantly beneficial in overcoming the problems of the classic combustion chambers or converging combustion chambers.

In some embodiments, the method 500 starts and includes determining 502 an initial geometry for the combustion chamber, e.g. combustion chambers 400, 600. It may be noted that this initial geometry may be viewed as an input to the simulation model. For example, the simulation model be used within the UCDS™ approach as described above with respect to FIG. 2. Simulation models may be used to model different types of combustion chambers. For example, a classic combustion chamber or a converging combustion chamber can be modeled by the UCDS™ methods but the classic combustion chamber or the converging chambers have inherent limitations due to the fact that their geometric shapes do not provide the shaping of the resonant acoustic modes so as to decouple them from the driving mechanisms as the hard portion of the combustion chamber.

Thus, practicing the method 500 may begin by determining 502 (e.g., defining) an initial geometry for a combustion chamber that may be for example, a diverging combustion chamber e.g., 400, 600. In some embodiments, the method 500 continues and includes performing 504 simulation to determine energy transfer between bulk fluid motion of gases through a combustion chamber and resonant acoustic modes of the combustion chamber using a simulation model.

It may be noted that in some embodiments, the individual steps depicted of performing simulation 504, configuring 506 the one or more combustion chamber parameters and determining 508 whether a predetermined stability level is met, may be performed simultaneously, performed in any order, performed iteratively, performed any number of times, and/or one or more of the individual steps may omitted. For example, if a particular design is already stable, the configuring 506 the one or more combustion chamber parameters may mean allowing them to remain without modification, In some embodiments, the method 500 continues and includes configuring 506 one or more combustion chamber parameters for the simulation model to shape the resonant acoustic modes to diminish coupling between the resonant acoustic modes 620 and driving mechanisms 630 at a head portion 612 of the combustion chamber 600 and to enhance coupling between the resonant acoustic modes 620 and damping mechanisms 632 at an aft portion 614 of the combustion chamber 600. At a high-level, embodiments of the method 500 may be implemented substantially as described above with respect to method 200 depicted in FIG. 2. More details about various embodiments of configuring 506 one or more combustion chamber parameters is described further below.

In some embodiments, the method 500 continues and includes determining 510 whether the combustion chamber (e.g., 400, 600) meets a predetermined performance level in response to determining 508 that the combustion chamber (e.g., 400, 600) meets a predetermined combustion stability level. In some embodiments, this may be done substantially as described above with respect to FIG. 2. In some embodiments, the method 500 continues and includes performing 504 additional simulation to determine energy transfer in resonant acoustic modes of the combustion chamber using a simulation model and further configuring 506 the one or more combustion chamber parameters to shape the resonant acoustic modes in response to determining 508 ("No" path) that the combustion chamber does not meet a predetermined combustion stability level.

In some embodiments, the method 500 continues and includes modifying 512 the one or more combustion chamber parameters to improve performance in response to determining 510 ("No" path) that the combustion chamber does not meet a predetermined combustion stability level. In other words, the method 500 optimizes first for stability and repeats the process if the predetermined combustion stability levels are not met but if the predetermined combustion stability level is met then the method 500 goes on to optimize performance.

If the predetermined performance level is not met then the method 500 modifies combustion parameters to meet performance and repeats the process of performing simulation and configuring combustion parameters if necessary to meet the predetermined combustion stability level. However, because of the robust stability provided by the diverging chamber design and other aspects of the method 500, any modifications needed to the combustion chamber parameters to meet performance should not introduce significant instability into the question chamber design.

In some embodiments, configuring the one or more combustion chamber parameters may include shaping 506a a geometry of the combustion chamber. For example, in some embodiments, shaping 506a the geometry of the combustion chamber includes geometrically defining a diverging portion of the combustion chamber that diverges radially outward at an angle relative to a cylindrical axis, where a diameter at the diverging portion of the combustion chamber is greater than a diameter of the combustion chamber at an injector end (see, e.g., the diverging combustion chamber 600 depicted in FIG. 6B). In some embodiments, shaping 506a a geometry of the combustion chamber may further include defining an aft portion of the combustion chamber to have a converging shape such that nozzle damping of the resonant acoustic modes is enhanced. More details regarding dimensions and angles are described below with respect to FIG. 6B.

In some embodiments, configuring the one or more combustion chamber parameters may include incorporating structures that shape the resonant acoustic modes such as for example incorporating one or more of a resonator and a cavity along at least a portion of the combustion chamber. For example, structures such as resonators may be incorporated at various locations within the combustion chamber 106a to pull the tangential resonant acoustic modes towards the resonators. In effect, this may enhance the benefits of a diverging chamber by pulling the acoustic modes 620 away from the driving mechanisms 630. In contrast to existing combustion chamber designs, such as depicted in FIG. 3, which locate resonators e.g. 322 near the injector end 308, in some embodiments similar resonators may be located at locations in the aft portion 614 of the combustion chamber 600 so as to enhance the decoupling of the resonant acoustic modes 620 from the driving mechanisms 630 and to enhance the coupling of the resonant acoustic modes to the damping mechanisms 632 such as nozzle damping.

In some embodiments, incorporating acoustic-modifying structures or resonators may include incorporating cavities, such as, for example, cavities 624, in the aft portion 614 of the combustion chamber 600. The cavities 624 are exposed to the flow and may act to increase the effective diameter of the combustion chamber 600. Thus, incorporating cavities in the aft portion may have the effect of increasing effective divergence at the location of the cavities 624. It is be noted that the depiction of cavities 624 in FIG. 6B as merely illustrative of a high-level concept and one or more cavity 624 may be placed along one or more portions of the combustion chamber 600 so as to diminish coupling of the acoustic modes 620 to the driving mechanisms 630 and to enhance coupling between the acoustic modes 620 and the damping mechanisms 632 near the nozzle throat 610.

In some embodiments, configuring the one or more combustion chamber parameters further includes modifying 506c a temperature profile of the combustion chamber e.g., 600 by decreasing an aft portion (e.g. 614) temperature relative to a head portion (e.g. 612) temperature. Doing so can alter the frequency and/or the mode shape of the acoustic waves. The frequency, amplitude, and phase at which the acoustic mode modulates vorticity and combustion may affect the overall stability. The temperature profile of a combustion chamber e.g. 600 is related to the combustion, and the combustion is related to the chemistry, the injection profile, the mixing of fuel and oxidizers.

In some embodiments, one or more of the combustion chamber parameters may be configured in concert to modify the temperature profile. For example, fuel and oxidizer selection may be configured to directly affect the amount of energy provided through chemical heat release which strongly contributes to the flame temperature and the overall temperature profile. Likewise, the injection profile and mixing characteristics of the injectors may be configured to affect the combustion efficiency. Modifying the combustion efficiency may also affect the amount of chemical energy released into the system, and therefore, the temperature profile such that these various combustion chamber parameters may be configured individual or in concert to improve stability by shaping the resonant acoustic modes.

In some embodiments, configuring 506 the one or more combustion chamber parameters further includes modifying 506d a speed of sound profile of the aft portion relative to a head portion. In some embodiments, modifying 506d the speed of sound profile may include altering one or more of a combustion chemistry, a temperature profile, an injection rate, an injector angle of impingement, an injector type, and injector mixing. The speed of sound profile provides another avenue to spatially shape the acoustic mode formation. In some embodiments, modifying 506d the speed of sound profile may have a comparable effect to changing the physical geometry.

For instance, in some embodiments, resonant acoustic modes may be shaped to be drawn towards regions of the chamber where the speed of sound is configured to be lower. In certain circumstances, the speed of sound profile may be configure so as to segregate an acoustic mode to specific regions within the chamber. Just as configuring combustion chamber parameters may include changing the geometry to isolate the acoustic mode, so too may configuring combustion chamber parameters to modify 506d the speed of sound profile be used to improve stability. Moreover, as with altering 506c the temperature profile, in some embodiments, modifying 506d the speed of sound profile may be performed by configuring the chemistry and the injection profile to affect the location of combustion upon injection.

Combustion occurring far from the injecting surface may cause a low-temperature region local to the headwall. This region would then have a lower speed of sound and therefore provide a preferential location for acoustic mode formation. In some cases, this could be detrimental since the preferred region for acoustic mode formation would be collocated with driving mechanisms near the headwall. Conversely, locally changing the speed of sound away from combustion region through cooling schemes would serve to reinforce the shaping of the acoustic mode to form away from the combustion region.

In some embodiments, configuring 506 the one or more combustion chamber parameters further includes configuring 506e a plurality of injector ports to diminish flow separation, where the injector ports include fuel ports and oxidizer ports at the head portion of the combustion chamber. In some embodiments, configuring the plurality of injector ports may include one or more of angling the injector ports, changing a size of the injector ports, changing a quantity of the injector ports, changing a ratio of fuel ports to oxidizer ports, and changing the mass flow rate of select fuel or oxidizer ports. More details about configuring the injector ports are provided below with respect to FIG. 7.

In some embodiments, the method 500 continues and includes determining 508 whether pre-determined combustion stability level is met. This may be done substantially as described above with respect to method 200 is depicted in FIG. 2. If the predetermined combustion stability level is not met, the method continues and includes performing further simulation of the acoustic modes and further configuring combustion chamber parameters to shift coupling of resonant acoustic modes away from driving mechanisms and toward damping mechanisms substantially as described above with respect to method 200 depicted in FIG. 2.

In some embodiments, if the predetermined combustion stability level is met, the method 500 continues and further includes determining 510 whether a predetermined performance level is met. If the predetermined performance level is not met the method 500 continues and includes modifying 512 combustion chamber parameters to meet a predetermined performance level and performing additional simulation and configuration of one or more combustion chamber parameters to diminish coupling between driving mechanisms and resonant acoustic modes and to enhance coupling between resonant acoustic modes and damping mechanisms, which may be accomplished substantially as described above.

In the embodiments, if the predetermined performance level is met, the method 500 continues and includes producing 514 a small-scale physical model of the combustion chamber having a shape based on the simulation model and verifying a combustion stability measure and a performance measure of the small-scale physical model of the combustion chamber. In other words, a stabilizing combustion chamber shape such as the combustion chamber 600 that is diverging may have a significant benefit producing a robust and stable combustion chamber design. The stability of the small-scale physical model of the combustion chamber may be further enhanced by implementing the small-scale physical model to include any configurations 506 made to the one or more combustion chamber parameters in the simulation model, e.g., resonators and/or cavities, temperature profiles, speed of sound profiles, injection port configurations, and so forth.

In some embodiments, the method continues and includes producing 516 a full-scale combustion chamber that is shaped according to the shape of the small-scale physical model. In contrast to existing combustion chamber design methods where scaling from a small-scale physical model to a full-scale physical model may introduce significant inconsistencies instability, the methods 200, 500 may enable a full-scale physical model to be produced and verified with significantly fewer inconsistencies between the full-scale physical model and the small-scale physical model.

It may be noted by one of ordinary skill in the art that certain elements of the method 500 may be implemented to beneficially improve stability but that stability is enhanced by the diverging shape of the combustion chamber, e.g., combustion chamber 600, and the one or more other combustion chamber parameters may be added to enhance stability brought about by the diverging shape. For example, in one embodiment, a method of designing a combustion chamber for a rocket engine to meet a predetermined combustion stability level, may include certain action such as determining resonant acoustic modes of the combustion chamber using a simulation model. In the embodiment, the method may further include shaping the resonant acoustic modes to diminish coupling between the resonant acoustic modes and driving mechanisms at a head portion of the combustion chamber. The method of the embodiment may further include geometrically defining a diverging portion of the combustion chamber that diverges radially outward at an angle relative to a cylindrical axis, where a diameter at the diverging portion of the combustion chamber is greater than a diameter of the combustion chamber at an injector end. In the embodiment, the method may further include configuring at least one injection parameter for the simulation model to diminish coupling between the resonant acoustic modes and driving mechanisms at a head portion of the combustion chamber and determining whether the combustion chamber meets a predetermined performance level while continuing to meet the predetermined combustion stability level.

Referring now in more detail to FIGS. 6A and 6B, FIG. 6A is a cross-sectional side elevation view of one embodiment of a combustion chamber 600 that is diverging. This unique diverging geometry has a beneficial effect on the stability of the combustion chamber as described above and thereby has a beneficial effect on the stability of a rocket. In one embodiment, the combustion chamber 600 has an elongated cylindrical shape. In the embodiment, an aft portion 614 of the combustion chamber 600 is adapted to connect to a nozzle 618 at a nozzle throat 610, and a head portion 612 of the combustion chamber 600 is adapted to connect to an injector 616 at an injector end 608 wherein a substantial part of the head portion 612 diverges radially outward at an angle $A_D$ relative to a cylindrical axis 602.

In some embodiments, the combustion chamber 600 is shaped to diminish coupling between resonant acoustic modes at the head portion and driving mechanisms. For example, the combustion chamber 600 that is diverging has a geometric shape that shifts the resonant acoustic modes 620 away from the acoustic mode driving mechanisms (e.g. 630) of the combustion chamber 600.

In some embodiments, the resonant acoustic modes are shaped to diminish coupling by altering one of more of acoustic pressure, acoustic velocity, acoustic density, acoustic temperature of the resonant acoustic modes so as to shape the acoustic modes 620 and shift them away from coupling with the driving mechanisms 630.

In some embodiments, a ratio of a head portion length $L_H$ to a combustion chamber length $L_C$, may have a range selected from 0.1 to 0.5, 0.5 to 0.95, or 0.6 to 0.8. It may be apparent to one of skill in the art that FIG. 6B depicts one embodiment where the ratio of the head portion length Lh to the combustion chamber length $L_C$ is about 0.5. However, other ratios may be suitable, where the shape of combustion chamber 600 diminishes coupling between the resonant acoustic modes 620 and the driving mechanisms 630 such as those driving mechanisms resulting from combustion.

In some embodiments, the angle $A_D$, e.g. the angle of divergence, of the diverging combustion chamber 600 is within a range selected from 5.4° to 6.6°, 7.2° to 8.8°, 6° to 10°, and 4.5° to 7.5°. If the angle $A_D$ is too small, the acoustic mode shaping process will not be useful for increasing stability. Likewise, if the angle $A_D$ is too large, the shape of the acoustic modes may split and create one mode near the nozzle and another mode near the injector thereby negating the benefits. Moreover, if the angle $A_D$ is too large, it may result in a flow separation that may increase the rate of energy transfer from a vorticity mechanism.

In some embodiments, the aft portion 614 is shaped to increase acoustic mode damping at the aft portion 614. For example, resonant acoustic mode 620 is most pronounced near the maximum diameter of the aft portion 614. In some embodiments, the converging section defining the nozzle entrance is designed to enhance the acoustic energy transferred through the nozzle. This may act to dampen the resonant wave. Other damping mechanisms such as cavities and/or resonators may be included in the aft portion 614 near the nozzle throat 610.

Figure 7:
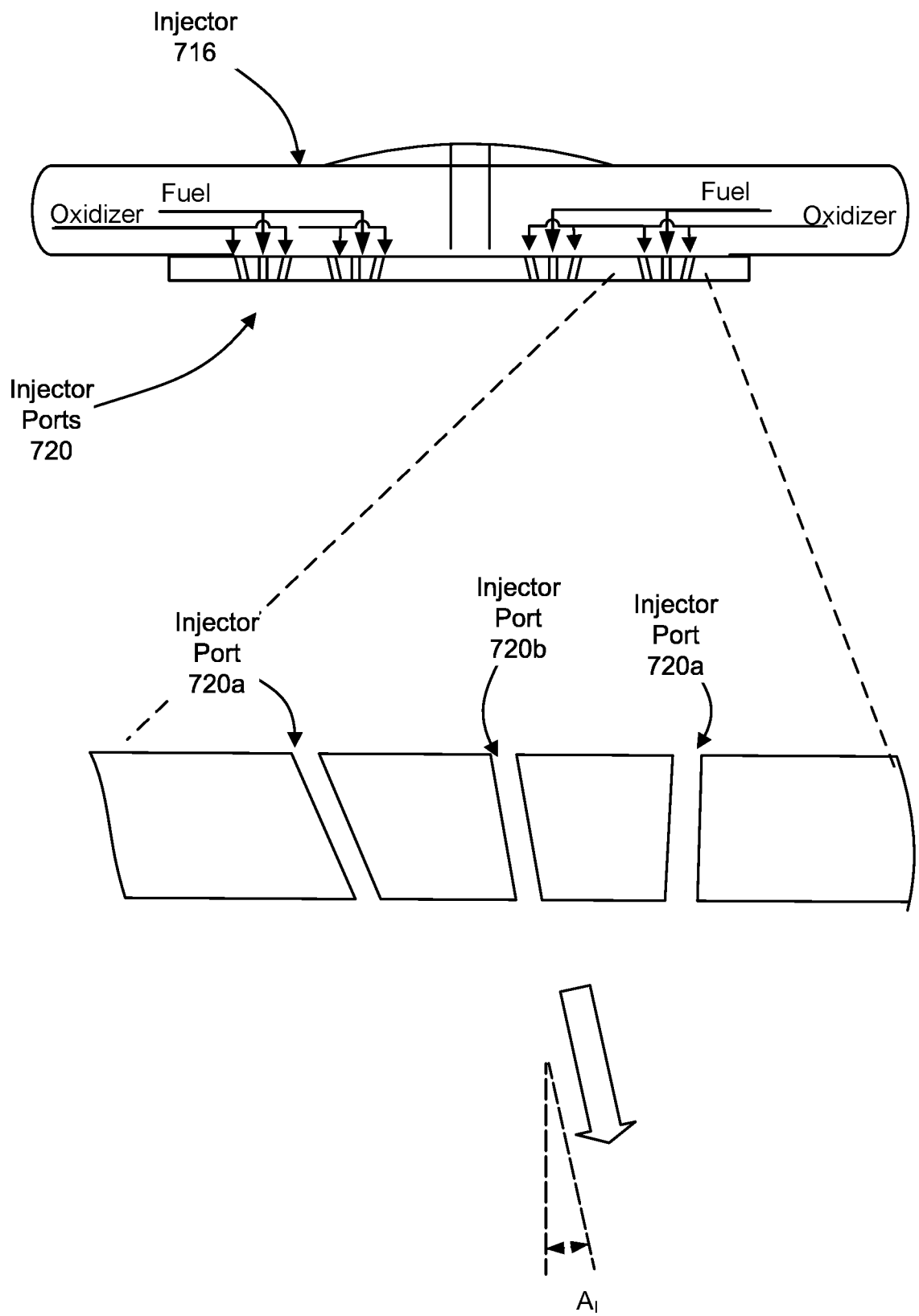
FIG. 7 is a schematic block diagram of an injector and a detailed cross-sectional side elevation view of a portion of the injector, with a plurality of fuel and oxidizer injector ports, that inject reactants at an outward angle relative to the cylindrical axis toward the diverging portion of the combustion chamber, according to one or more embodiments of the present disclosure.

FIG. 7 is a schematic block diagram and a cross-sectional side elevation view of a portion of an injector with a plurality of fuel and oxidizer injector ports that inject reactants at an outward angle relative to the cylindrical axis toward the diverging portion of the combustion chamber, according to one or more embodiments of the present disclosure.

In some embodiments, the injector 716 may include a plurality of injector ports 720 including fuel injector ports, such as for example, fuel port 720b and oxidizer ports 720a. The plurality of injector ports may be disposed at the head portion, e.g. head portion 412, 612, and one or more of the plurality of injector ports 720 may be adapted to diminish flow separation. For example, one or more of the injector ports 720 may be angled at predetermined angle AP with respect to the cylindrical access of the combustion chamber so as to inject impinging streams of liquid into the combustion chamber.

Angling the injector ports 720 may act to prevent a negative pressure gradient along the inner wall of the combustion chamber, e.g., a combustion chamber 400, 600 that is diverging, where the negative pressure gradient may produce flow separation (e.g. vorticity) that can couple with the acoustic mode and thereby create an alternative mechanism to transfer energy from the mean flow into the acoustic modes. In some embodiments, a first subset of the injector ports 720 may be within a range selected from 8° to 12°, and a second subset of the injector ports 720 may be angled at an angle in the range of 27° to 33°.

However, other angles and other variations of injector ports may be used to provide a smooth mean flow of propellant that does not produce flow separation or recirculation zones that couple with the acoustic modes. For example, injection parameters that may be changed may include changing the size of the injector ports 720, changing the number of injector ports 720, changing the ratio of oxidizer ports to fuel ports, are all techniques that can be used to produce a smooth mean flow of propellant and thus reduce coupling between driving mechanisms and acoustic modes.

As an example, in some embodiments, changing the size of the injector ports may be used to affect the fluid momentum assuming a constant mass flow rate. A momentum imbalance may be used with impinging injectors to divert the resulting jet, post-impingement, at an angle commensurate with the divergence angle. Likewise, changing the number of injector ports along the radius may also change the direction of injected fluid flow. This differs from the previous example where, while biasing the angle of the impinging jet for a single injector provides local control, changing the number of injectors along the radius may be used to bias the angle of the bulk fluid motion. In some embodiments, changing the ratio of oxidizer to fuel ports may be used to control the combustion profile to improve stability y. In some embodiments, the injector profile may be configures to control expansion of gases due to combustion to have a similar global effect on stable combustion as changing the number of injectors. By concentrating the expansion of gases to a local region, a momentum imbalance may be used to keep the bulk fluid motion parallel to the angle of divergence such that the stability of the combustion chamber is improved.

It may be noted by one of skill in the art that the combustion chambers and methods of designing combustion chambers disclosed herein provide significant improvements over existing combustion chambers and design methods by shaping acoustic modes through a variety of structures and methods so as to diminish coupling between the acoustic modes and the driving mechanisms and to enhance the damping of such acoustic modes by coupling the acoustic modes to damping mechanisms. This results in a scalable and acoustically stable combustion chamber that significantly reduces time and expenses associated with both simulation modeling as well as physical small-scale and full-scale modeling.

The present subject matter may be embodied in other specific forms without departing from its spirit or essential characteristics. The described embodiments are to be considered in all respects only as illustrative and not restrictive. All changes which come within the meaning and range of equivalency of the claims are to be embraced within their scope.

What is claimed is:

1. A method comprising:

determining an initial geometry for a combustion chamber, the initial geometry comprising a head portion that couples to an injector having a plurality of liquid fuel injector ports configured to inject liquid fuel and a plurality of liquid oxidizer injector ports configured to inject liquid oxidizer, the head portion having a wall with a frustoconical shape that monotonically diverges radially outward in an aftward direction at a divergence angle relative to a centerline axis, and the initial geometry further comprising an aft portion defined by a surface of revolution formed by revolving a sigmoid about the centerline axis, wherein the aft portion extends from the head portion to a maximum diameter of the combustion chamber in a peak acoustic coupling region of the combustion chamber and, from the maximum diameter, converges radially inward in the aftward direction;

performing a simulation of the combustion chamber using a simulation model having the initial geometry to determine energy transfer in resonant acoustic modes of the combustion chamber;

configuring one or more combustion chamber parameters to shift coupling of the resonant acoustic modes away from acoustic mode driving mechanisms at the head portion of the combustion chamber;

determining stability of the simulation model having the configured combustion chamber parameters;

determining performance of the simulation model having the configured combustion chamber parameters;

producing a small-scale physical model of the combustion chamber in response to determining stability and performance of the initial geometry of the simulation model having the configured combustion chamber parameters;

determining stability and performance of the small-scale physical model; and producing, in response to determining the stability and performance of the small-scale physical model and based on the initial geometry of the simulation model having the configured combustion chamber parameters, a full-scale apparatus comprising:

the combustion chamber having the wall, the wall having the head portion and the aft portion, the wall configured to contain combustion, the combustion chamber comprising:

the head portion of the wall having the frustoconical shape that monotonically diverges radially outward in the aftward direction at the divergence angle relative to the centerline axis of the combustion chamber; and the aft portion of the wall defined by the surface of revolution formed by revolving the sigmoid about the centerline axis, wherein the aft portion extends smoothly from the head portion to the maximum diameter of the combustion chamber in the peak acoustic coupling region of the combustion chamber and, from the maximum diameter, converges radially inward in the aftward direction; and the injector connected to the head portion of the wall, the injector having the plurality of liquid fuel injector ports and the plurality of liquid oxidizer injector ports configured to respectively inject impinging streams of liquid fuel and liquid oxidizer into the head portion of the wall, wherein an average magnitude of resonant acoustic modes in the peak acoustic coupling region of the aft portion exceeds an average magnitude of acoustic resonant modes proximate to the acoustic mode driving mechanisms generated in the head portion during combustion.

2. The method of claim 1, wherein configuring the one or more combustion chamber parameters comprises incorporating one or more resonators at the aft portion to enhance coupling of the resonant acoustic modes to acoustic mode damping at a nozzle of the full-scale apparatus.

3. The method of claim 1, wherein configuring the one or more combustion chamber parameters comprises modifying a temperature profile of the combustion chamber by decreasing an aft portion temperature relative to a head portion temperature.

4. The method of claim 1, wherein configuring the one or more combustion chamber parameters comprises modifying a speed of sound profile of the aft portion to be lower than a speed of sound profile of the head portion.

5. An apparatus comprising:

a combustion chamber having a wall configured to contain combustion, the combustion chamber comprising:

a head portion of the wall, the head portion having a frustoconical shape that monotonically diverges radially outward in an aftward direction at a divergence angle relative to a centerline axis of the combustion chamber; and an aft portion of the wall, the aft portion defined by a surface of revolution formed by revolving a sigmoid about the centerline axis, wherein the aft portion extends smoothly from the head portion to a maximum diameter of the combustion chamber in a peak acoustic coupling region of the combustion chamber and, from the maximum diameter, converges radially inward in the aftward direction; and an injector connected to the head portion of the wall, the injector having a plurality of injector ports, the plurality of injector ports comprising one or more liquid fuel injector ports and one or more liquid oxidizer injector ports configured to respectively inject impinging streams of liquid fuel and liquid oxidizer into the head portion of the wall, wherein an average magnitude of resonant acoustic modes in the peak acoustic coupling region of the aft portion exceeds an average magnitude of acoustic resonant modes proximate to one or more acoustic mode driving mechanisms generated in the head portion during combustion.

6. The apparatus of claim 5, wherein acoustic coupling of the resonant acoustic modes to the one or more acoustic mode driving mechanisms is diminished based on one or more parameters selected from acoustic pressure, acoustic velocity, acoustic density, and acoustic temperature of the resonant acoustic modes.

7. The apparatus of claim 5, wherein a ratio of a head portion length LH, beginning at an injector end of the combustion chamber and extending to the aft portion, to a combustion chamber length Lc, beginning at the injector end and ending at a nozzle connecting end of the combustion chamber, has a range selected from the group consisting of 0.1 to 0.5, 0.5 to 0.95, and 0.6 to 0.8.

8. The apparatus of claim 5, wherein the divergence angle is within a range selected from the group consisting of 5.4° to 6.6°, 7.2° to 8.8°, 6° to 10°, 10° to 15°, and 4.5° to 7.5°.

9. The apparatus of claim 5, wherein the plurality of injector ports are configured as a plurality of injector port sets, each injector port set disposed in the injector at the head portion and each injector port set having one or more structural parameters that diminish flow separation, the one or more structural parameters being selected from an injector port angle, a post-impingement reactant jet angle, an injector port size, an injector port quantity, a ratio of fuel injector ports to oxidizer injector ports, and combinations thereof.

10. The apparatus of claim 9, wherein the plurality of injector ports are respectively angled to inject the impinging streams of liquid fuel and liquid oxidizer towards the diverging portion of the combustion chamber at an outward angle relative to the centerline axis.

11. The apparatus of claim 5, wherein each of the plurality of injector ports is arranged in a coplanar arrangement such that an imaginary line can be drawn through all of the injector ports.

12. A system comprising:
an injector connected to a head portion of a combustion chamber and comprising a plurality of liquid fuel injector ports and a plurality of liquid oxidizer injector ports configured to respectively inject impinging streams of liquid fuel and liquid oxidizer into the head portion of combustion chamber;
a nozzle; and
the combustion chamber having an outer wall and having an inner wall configured to contain combustion, wherein an inner surface of the inner wall of the combustion chamber comprises:
the head portion that couples to the injector, wherein at the head portion the inner surface has a frustoconical shape that monotonically diverges radially outward in an aftward direction at a divergence angle relative to a centerline axis;
an aft portion defined by a surface of revolution formed by revolving a sigmoid about the centerline axis, wherein the aft portion extends from the head portion to a maximum diameter of the combustion chamber in a peak acoustic coupling region of the combustion chamber and, from the maximum diameter, converges radially inward in the aftward direction and wherein a cross-section of at least a portion of the aft portion is defined by a continuously differentiable function.

13. The system of claim 12, wherein at least one resonator is mounted to the aft portion of the inner surface of the inner wall of the combustion chamber to increase an effective divergence of the aft portion.

14. The system of claim 12, wherein the plurality of liquid fuel injector ports and the plurality of liquid oxidizer injector ports are angled at separate angles having a direction of intersection that is angled at an outwardly diverging angle relative to the centerline axis.

15. The system of claim 13, further comprising a fuel tank that supplies liquid fuel to the plurality of liquid fuel injector ports and an oxidizer tank that supplies liquid oxidizer to the plurality of liquid oxidizer injector ports.

16. The system of claim 12, wherein each of the plurality of liquid fuel injector ports and each of the plurality of liquid oxidizer injector ports is arranged in a coplanar arrangement such that an imaginary line can be drawn through all of the liquid fuel injector ports and all of the liquid oxidizer injector ports.

* * * * *